United States Patent

[11] 3,581,842

| | | |
|---|---|---|
| [72] | Inventor | James R. Hall |
| | | Toledo, Ohio |
| [21] | Appl. No. | 795,422 |
| [22] | Filed | Jan. 31, 1969 |
| [45] | Patented | June 1, 1971 |
| [73] | Assignee | Oldberg Manufacturing Company |
| | | Grand Haven, Mich. |

[54] EXHAUST MUFFLER AND METHOD OF AND ADAPTER MEANS FOR MOUNTING SAME
17 Claims, 11 Drawing Figs.

[52] U.S. Cl.................................................... 181/72,
181/54, 285/31, 285/417, 285/165, 285/302
[51] Int. Cl....................................................... F01n 7/18,
F16l 21/00, F16l 27/12
[50] Field of Search............................................ 181/54, 72,
36.2, 64.1; 285/302, 31, 165, 417; 287/54.1, 58
C.T.; 138/155, 106, 107, 109

[56] References Cited
UNITED STATES PATENTS

| | | | |
|---|---|---|---|
| 530,917 | 12/1894 | Ames.............................. | 285/417 |
| 1,890,151 | 12/1932 | Hadley........................... | 181/72X |
| 1,975,925 | 10/1934 | Compo........................... | 181/72UX |
| 2,194,163 | 3/1940 | Dahl................................ | 181/64(.1) |
| 2,357,791 | 9/1944 | Powers........................... | 181/54 |
| 3,106,984 | 10/1963 | Carter............................. | 181/72UX |
| 3,126,992 | 3/1964 | McCullough.................. | 138/109X |
| 3,283,847 | 11/1966 | Kerns et al.................... | 181/72UX |

FOREIGN PATENTS

| | | | |
|---|---|---|---|
| 492,498 | 4/1953 | Canada......................... | 287/58c.T. |
| No1,153 | 1869 | Great Britain................ | 285/31 |
| 374,511 | 2/1964 | Switzerland.................. | 287/58c.T. |

*Primary Examiner*—Robert S. Ward, Jr.
*Attorney*—Harry O. Ernsberger

ABSTRACT: The disclosure embraces a muffler construction for use with the exhaust gas conveying system of an internal combustion engine of an automotive vehicle, the muffler construction embodying adapter mounting means telescopingly associated with the muffler construction, and a method facilitating installation of a replacement muffler construction through connection of the adapter means with existing gas passage means such as the exhaust pipe and a tail pipe.

INVENTOR.
JAMES R. HALL
BY
Harry O. Ernsberger
ATTORNEY

INVENTOR.
JAMES R. HALL
BY
Harry O. Ernsberger
ATTORNEY

EXHAUST MUFFLER AND METHOD OF AND ADAPTER MEANS FOR MOUNTING SAME

The invention relates to sound attenuating devices, mufflers or silencers for use with the exhaust gas system of internal combustion engines of automotive vehicles and more especially to a muffler or a sound attenuating device embodying adapter means for connection with the existing exhaust pipe and tail pipe involving a novel method of installation of a replacement muffler.

It is well known that muffler constructions used with exhaust systems of automotive vehicles are subject to comparatively rapid deterioration by reason of their being subjected to weather conditions and particularly contaminated water such as that encountered on wet roadways especially where salt has been utilized to melt ice from the roadways. Mufflers are usually fabricated of ferrous metal such as sheet steel and readily become rusted, not only from exposure to moisture and water but deterioration by condensation occurring interiorly of the muffler by reason of the wide range of exhaust gas temperatures to which the muffler is subjected.

Muffler constructions embodied in automotive vehicles are supported through connection with an exhaust pipe and a tail pipe so as to isolate the muffler from contact with any other portion of the vehicle. The exhaust pipe and the tail pipe of the exhaust conveying system are secured to struts or frame members of the vehicle in a well-known manner.

Heretofore, it has been conventional practice in effecting replacement of a worn muffler to dislodge the connection of the muffler with the exhaust pipe and tail pipe constructions so as not to impair or damage the exhaust pipe or tail pipe and to install a muffler substantially identical with the worn muffler and the clamping means replaced in such installation. This method of muffler replacement is very tedious and time-consuming in order to avoid damage to the exhaust pipe and the tail pipe construction.

Another method employed in some instances is to remove the worn muffler, the exhaust pipe and the tail pipe and install a replacement muffler together with a new exhaust pipe and a new tail pipe. This method renders muffler replacement quite expensive. Various models and makes of automotive vehicles are designed for installation of mufflers in particular positions and for varying sizes with exhaust and tail pipes of various sizes and shapes. Thus, many different types and sizes of muffler construction have been and are being used, each adapted to fit a particular installation. These conditions necessitate the maintenance of a substantial inventory of muffler constructions for replacements of worn mufflers.

The present invention embraces a method of installing a muffler construction wherein a muffler is disposed in the desired position of engagement with the frame structure of an automotive vehicle and slidably moving or adjusting tubular couplings of the muffler construction into telescopic connection with exhaust gas conveying components of the exhaust gas system for the internal combustion engine of the vehicle, then securely clamping the couplings to the muffler construction and to the gas conveying components of the system whereby the muffler is supported by the gas conveying components.

An object of the invention embraces a method of replacing a muffler construction in an exhaust gas conveying system of an internal combustion engine of an automotive vehicle wherein a first adapter is extended from the replacement muffler construction into connecting relation with a first gas passage tube of the system and a second adapter extended into connecting relation with a second gas passage tube, the adapters then being secured to the gas passage tubes and to the muffler construction.

An object of the invention resides in a muffler construction of a character having tubular means to telescopingly accommodate adapters extensible from the muffler construction into overlapping telescoping engagement with gas passage tubes of an exhaust gas conveying system of an internal combustion engine whereby to facilitate installation of a replacement muffler in the system.

Another object of the invention resides in a muffler construction having tubular gas passage means accommodating adapters telescoped therein which are extensible for connection with gas passage tubes of an engine exhaust gas system whereby adapters may be utilized of a character rendering the muffler construction adaptable for embodiment in various exhaust gas systems wherever connections may be made between adapters of the proper size and gas passage tubes of an exhaust gas system.

Another object of the invention resides in a muffler construction having a gas passage means provided with telescopingly disposed tubular adapter means extensible to positions for coupling with exhaust gas conveying pipes wherein a muffler construction is of a character adapting it for replacement in exhaust gas conveying system of different models and makes of vehicles thereby to reduce the inventory of mufflers necessary to provide replacement installations in various models of automotive vehicles.

Another object of the invention resides in a muffler for an exhaust gas system of an internal combustion engine embodying extensible adapter tubes for connection with an exhaust pipe and a tail pipe of an exhaust gas conveying system of a vehicle engine thereby to facilitate installation of a replacement muffler wherein the muffler is supported through the adapter tubes.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

While the muffler constructions embodying adapter means or coupling members are of character particularly facilitating installation of the muffler as a replacement, it is to be understood that the muffler construction with adapter means may be embodied in an exhaust system of a vehicle as original equipment.

Figure 1:
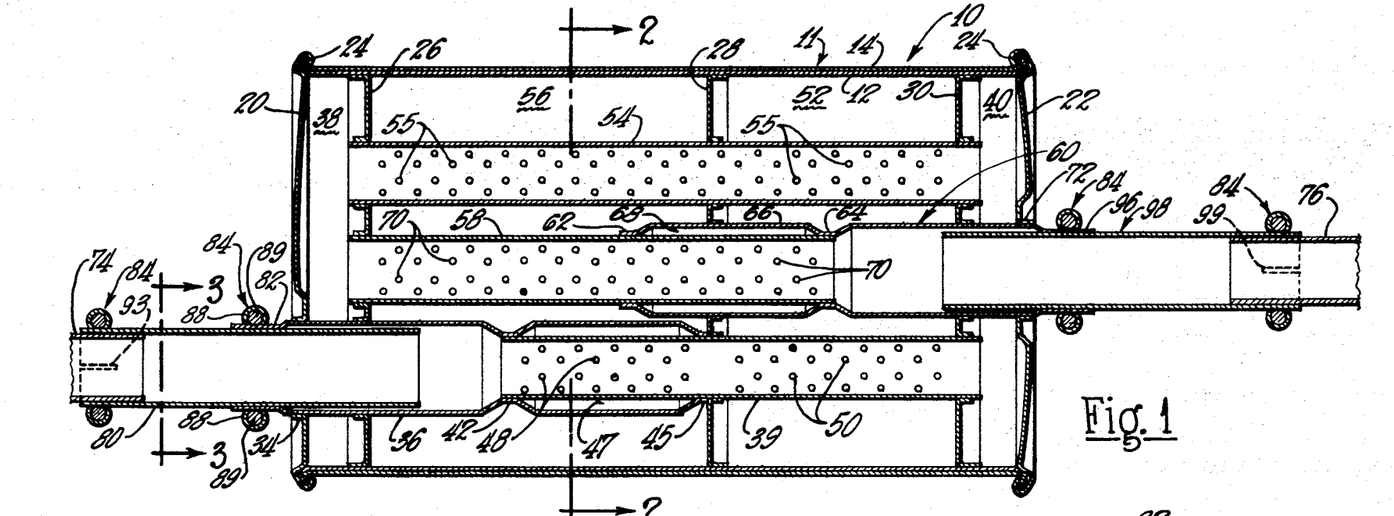
FIG. 1 is a longitudinal sectional view of a muffler or sound attentuating means tubular adapter means of the invention, the view being taken on the line 1-1 of FIG. 2.
Figure 2:
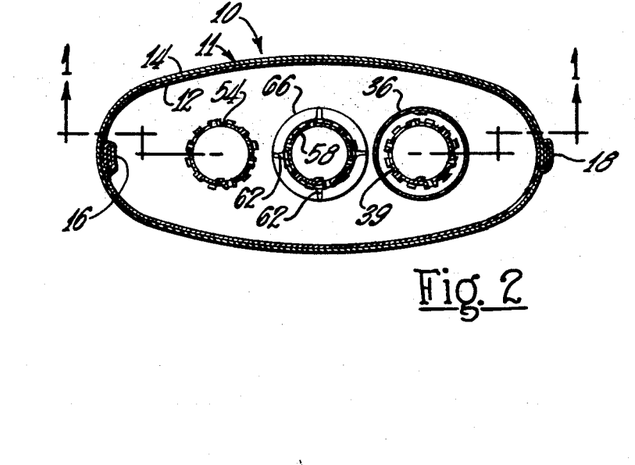
FIG. 2 is a transverse sectional view taken substantially on the line 2-2 of FIG. 1.

Referring to the drawings in detail and initially to FIGS. 1 and 2, there is illustrated a muffler construction 10 of a type employed in the exhaust gas system of an internal combustion engine of an automotive vehicle, the muffler construction 10 being particularly for installation as a replacement for a worn muffler construction. The muffler shown in FIGS. 1 and 2 has a shell or casing 11 which is preferably of the double layer or double wall type having an inner thin wall layer or shell 12 and an outer thin wall layer or shell 14, each layer or wall being a single thin sheet of metal.

As shown in FIG. 2, the elongated muffler shell or housing construction 11 is of generally oval configuration in cross section, the overlapping ends of the inner shell or layer 12 being lock seamed together as shown at 16, the lock seam extending inwardly of the shell. The outer shell or layer 14 is wrapped around the inner shell 12, the overlapping ends of the outer shell 14 being lock seamed as shown at 18, the lock seam projecting exteriorly of the housing or casing 11. The muffler shell construction is provided with end heads 20 and 22, the end heads being lock seamed as at 24 to the casing 11 comprising the metal layers 12 and 14.

In the construction shown in FIG. 1, the muffler 10 includes lengthwise-spaced transversely extending baffles 26, 28 and 30 which divide the interior into chambers and provide support for gas passage means disposed within the muffler. The end head 20 at the inlet end of the muffler is provided with a circular opening defined by a flange 34 through which extends an inlet gas passage means or tube 36, the tube 36 extending through an opening in the baffle 26, the end head 20 and the baffle 26 providing a transverse gas passage or chamber 38. The wall of the tube 36 at the region of the chamber 38 is imperforate.

The tube 36 is in communication with a gas passage means or tube 39, the tube 39 extending through openings in the baffles 28 and 30 opening into a transverse gas passage or chamber 40 provided between the end head 22 and the baffle 30. The gas passage means or tubular section 39 is of lesser diameter than the inlet gas passage tube 36. The tube 36 is fashioned with a reduced cross section indicated at 42 provided by pinching or crimping metal of the tube 36, the effect of the crimping being to reduce the region 42 of the tube to an interior diameter snugly receiving an end region of the gas passage tube 39.

The end region 45 of the tube 36 is pinched or crimped in a like manner to provide a reduced diameter region in snug engagement with the exterior of the gas passage tube 39. The space between the pinched or crimped sections 42 and 45 of the tube 36 exteriorly of the tube 39 provides an annular chamber 47 which is in communication with the gas passage tube 39 through a group of small openings or passages 48.

The chamber 47 provides an attentuating zone or region for attenuating high frequency sound waves of the stream of exhaust gases moving through the gas passage means from an internal combustion engine, the openings 48 in the tube 39 providing acoustic couplings with the chamber 47. A wall portion of the gas passage tube 39 is provided with a second group of small openings or passages 50 which form acoustic couplings with a chamber 52 provided between the baffles 28 and 30. The openings 50 also facilitate transverse flow of exhaust gases through the chamber 52.

The muffler is fashioned with a second or intermediate gas passage means or tube 54 extending through aligned openings in the transverse baffles 26, 28 and 30, the tube 54 opening into the end chamber 38 and 40 respectively. The tube 54 is fashioned with a large number of small openings or outlets 55 throughout substantially its length which form acoustic couplings with chamber 52 and a chamber 56, the latter being defined by the baffles 26 and 28. The openings 55 also facilitate transverse passage of gases through the chamber 52 and 56.

The muffler is fashioned with a third gas passage means comprising a tube 58 and a gas outlet tube 60. The outlet tube 60 has its inner end region 62 pinched or crimped at second circumferential regions, as shown in FIG. 2, whereby the end region of the tube is in snug engaging relation with the exterior of the gas passage tube 58.

The tube 60 is fashioned with an intermediate region 64, the metal of the tube being pinched or crimped inwardly whereby the region 64 of the tube 60 is in contiguous snug engagement with the right-hand end region of the gas passage tube 58.

The portion 66 of the outlet tube 60 between the pinched or crimped regions 62 and 64 provides an annular chamber 68. The gas passage tube 58 is fashioned with a comparatively large number of small outlets or openings 70, and the openings 70 adjacent the chamber 68 provide acoustic couplings with the chamber for attentuating high frequency sound waves. The regions 42 and 45 of the inlet tube 36 are crimped inwardly in the same manner as shown at 62 in FIG. 2. The outlet tube 60 extends through an opening in the end wall 22 and is welded to a flange 72 defining the opening.

The muffler construction is of a character particularly adapted for replacement of a worn muffler in the exhaust gas conveying system of an internal combustion engine. A muffler in such exhaust gas conveying system is disposed between the engine exhaust pipe 74 and the tail pipe 76. In the conventional muffler installation, the exhaust pipe usually extends into a short inlet bushing projecting exteriorly of the end head of the muffler construction and the tail pipe extends into a similar bushing extending exteriorly from the opposite end head of the muffler construction.

In such muffler constructions, after extended periods of use wherein the muffler is subjected to weather conditions, the exhaust pipe and the tail pipe as well as the bushings may have become rusted to the extent that it may be difficult, if not impossible to remove the worn muffler without damaging the exhaust pipe and the tail pipe. Muffler replacement installations heretofore made of this character are expensive as the damaged exhaust pipe and tail pipe must be replaced even though they may be in an otherwise operable condition.

The muffler construction of the invention is especially adapted to replace a worn muffler without necessitating the replacement of the exhaust pipe or the tail pipe. This method is accomplished through the use of relatively slidable tubular coupling means associated with and telescoped in the inlet and outlet gas passage means and arranged to be telescoped with the exhaust pipe and the tail pipe even though a portion of the exhaust pipe and a portion of the tail pipe adjacent the end heads of the worn muffler are severed to effect removal of the worn muffler.

Referring particularly to FIG. 1, a coupling member, adapter or tube 80 is telescoped into a region of the inlet tube 36. The inlet end 82 of the tube 36 exteriorly of the head 20 may be of slightly reduced diameter, as shown in FIG. 1, the reduced diameter region snugly, yet slidably, receives the inlet coupling member to coupling tube 80.

The coupling tube 80 being slidably telescoped in the inlet tube 36, is extended in a left-hand direction, as viewed in FIG. 1, into overlapping telescoping relation with the end of the exhaust pipe 74 which has been severed adjacent the inlet end head of the worn muffler to remove the muffler.

Figure 3:
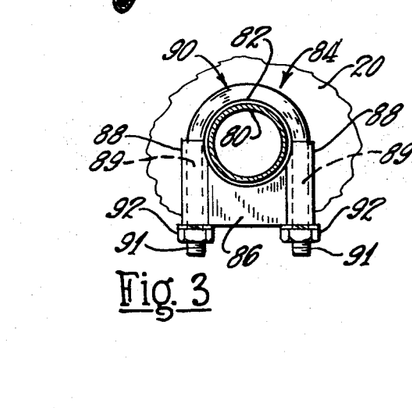
FIG. 3 is a detail view of a clamping means the view being taken substantially on the line 3-3 of FIG. 1.

In replacing a worn muffler it is unnecessary to cut or sever the exhaust pipe 74 at a specific region as the coupling member 80 is slidably adjustable outwardly from the inlet tube 36 to secure the desired overlapping relation with the severed end of the exhaust pipe 74. The portion 82 of the inlet tube 36 extending exteriorly of the end head 20 of the muffler is drawn into fixed or clamped engagement with the coupling or tube 80 by a suitable clamping means, preferably of the character illustrated in FIG. 3. The clamp means illustrated in FIG. 3 is preferably of the character disclosed in Riker Pat. No. 2,719,345 but other conventional clamp means may be used.

The clamp means 84 includes a saddle member 86 having parallel cylindrical portions 88 which receive the leg portions 89 of a U-shaped clamping bolt 90, the bight portion of the clamping bolt 90 encircling one-half of the periphery of the portion 82 of the inlet tube, and the saddle 86 embracing the remaining one-half of the periphery of the portion 82.

The leg portions 89 are threaded as at 91 to receive clamping nuts 92 for drawing up the clamp components 86 and 90 into snug engagement with the portion 82 to draw the said portion into tight engagement with the exterior surface of the coupling member or tube 80 so as to form a gastight seal of the portion 82 with the coupling 90. The clamping engagement of the portion 82 with the coupling member 80 is effective to securely hold the coupling 80 in fixed relation with the inlet tube 36.

A similar clamping means 84 embraces the overlapping region of the coupling 80 with the exhaust pipe 74, as shown in FIG. 1, by drawing up the adjacent clamp means 84 in the manner above explained. As gastight connection is effected between the outer end of the coupling 80 and the adjacent end of the exhaust pipe 74 telescoped therewith. In this manner the exhaust pipe 74 provides one support means for the muffler construction 10 as the clamp means 84 provides against relative movement of the means clamped thereby. The end of the coupling member 80 may be provided with diametrically-arranged open-ended slots 93 to facilitate drawing the coupling tube 80 into source engagement with the exhaust pipe 74.

The outlet region 96 of the outlet tube 60 extending exteriorly of the end head 22 is of slightly lesser diameter than the adjacent portion of the tube within the muffler. Telescoped within the tube 60 is a tubular outlet coupling or member 98 which is slidable into a region of the inlet tube and is in snug, but slidable engagement with the portion 96 of the tube 60. The end region of the coupling tube 98 exteriorly of the end head 62 is adapted to be slidably adjusted into overlapping telescoping relation with the tail pipe 76 in the manner shown in FIG. 1.

The slidable mounting of the coupling member 98 makes possible the adjustability of the coupling 98 lengthwise of the muffler into overlapping relation with the tail pipe 76.

When the coupling 98 has been adjusted to the desired position, the portion 96 of the outlet tube 60 is drawn by the adjacent clamping means 84 into secure gastight engagement with the tubular coupling 98 to hold the coupling 98 in its adjusted position with respect to the muffler 10.

The clamping means 84, embracing the overlapping region of the coupling member 98 with the tail pipe 76, is drawn up to securely engage the end region of the coupling member with the tail pipe to form a gastight or sealed connection between the coupling member and the tail pipe. The end region of the coupling member 98 is preferably provided with diametrically opposed slots 99 to facilitate drawing the coupling member into snug engagement with the tail pipe 76.

The method of installing the muffler 10 as a replacement for a worn muffler in the exhaust gas conveying system of an internal combustion engine of an automotive vehicle is as follows: The regions of the existing exhaust pipe 74 and the tail pipe 76 adjacent the ends of the worn muffler to be replaced are severed or cut off by a saw or other severing instrumentality and the worn muffler thus removed.

The operator then disposes the replacement muffler in position between the severed ends of the exhaust and tail pipes and manually slidably withdraws the tubular coupling 80 outwardly from the muffler into telescoped overlapping relation with the exhaust pipe 74, a substantial portion of the coupling 80 remaining within the inlet gas passage tube 36.

The operator then partially withdraws the coupling member 98 in a like manner into telescoped overlapping relation with the end region of the tail pipe 76, a portion of the coupling member remaining within the outlet gas passage tube 60.

The operator then disposes the four clamping means 84 in the positions illustrated in FIG. 1 and draws up each clamp by manipulating the nuts 92 of the clamping means to securely fasten or hold the muffler 10 to the tubular couplings 80 and 98 and securely fasten or hold the tubular couplings to the exhaust pipe 74 and the tail pipe 76.

Through this method the replacement muffler 10 may be quickly and easily installed between the existing exhaust pipe 74 and the tail pipe 76 and, through the medium of the clamping means 84, the muffler 10 is fixedly mounted and supported solely by the exhaust pipe 74 and the tail pipe 76. In such arrangement the coupling members 80 and 98 may be of lengths to accommodate the muffler to various installations simply by slidably adjusting the couplings 80 and 98 lengthwise with respect to the muffler. After the proper slidable adjustment of the coupling members has been made and the clamps 84 drawn into clamping position, the muffler is fixedly secured against relative movement.

The same muffler may be adaptable for various installations through the use of the slidable tubular coupling members of various lengths accommodating varying distances between an exhaust pipe and a tail pipe of an exhaust gas conveying system of an automotive vehicle.

It should be noted that the portions 82 and 96 of the inlet and outlet gas passage tubes are preferably of slightly reduced diameter providing clearance space between the inlet coupling 80 and the adjacent portion of the tube 36 into which it is telescoped and the adjacent portion of the tube 60 in which the outlet coupling 98 is telescoped so as to minimize friction and thus enchance the slidable adjustment of these coupling members with respect to the muffler.

The path of gas flow in the installed muffler is as follows: The exhaust gases from the exhaust pipe 74 flow through the tubular coupling or adapter 80 and gas passage means 36 and 39, the major amount of the gases flowing into the chamber 40 and transversely through the chamber into the intermediate gas passage means or tube 54, some of the gases in the tube 39 flowing through openings 50 through chamber 52 and openings 55 into the intermediate gas passage tube 54.

The gases move in a left-hand or reverse direction through the tube 54, as viewed in FIG. 1, a portion of the gases flowing into the chamber 38 thence transversely into the gas passage tubes 58 and 60 and through the coupling member 98 into the tail pipe 76. Some of the gases in the intermediate tube 54 flow through openings 55 and transversely through chamber 56 into openings in the tube 58 and are conveyed by the tube 58 into the tube 60 and coupling member or adapter 98 and into the exhaust pipe 76.

Figure 4:
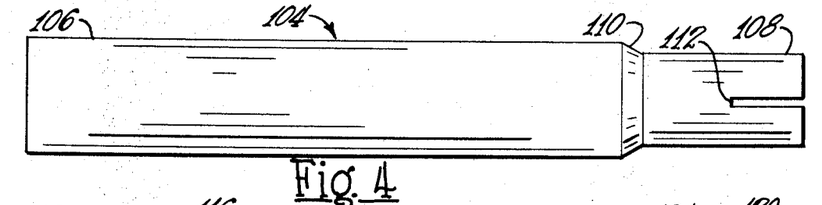
FIG. 4 is an elevational view of one form of tubular adapter of the muffler construction.

The coupling members arranged to be telescoped into gas passage means or tubes of the muffler construction may be fashioned so as to provide operative telescoping connection with exhaust pipes and tail pipes of varying diameters. FIG. 4 illustrates a coupling member 104 having a portion 106 of a diameter to be slidably received within either of the portions 82 or 96 of the gas passage tubes 36 or 60. The coupling member 104 may be used at the inlet end or at the outlet end of the muffler construction.

In the form shown in FIG. 4, one end region 108 of the coupling member 104 is of reduced diameter, this portion being an integral part of the member 104 and joined with it through the frustoconically shaped or tapered region 110. The portion 108 may be fashioned by swaging a portion of the tubular coupling 104 to form the portion 108 of reduced diameter. The portion 108 may be provided with open-ended diametrically disposed slots 112 so that the same may be readily clamped into gastight engagement with an exhaust pipe where the coupling member is used at the inlet end of the muffler, or clamped to the tail pipe where the coupling member is utilized at the gas outlet of the muffler.

Figure 5:
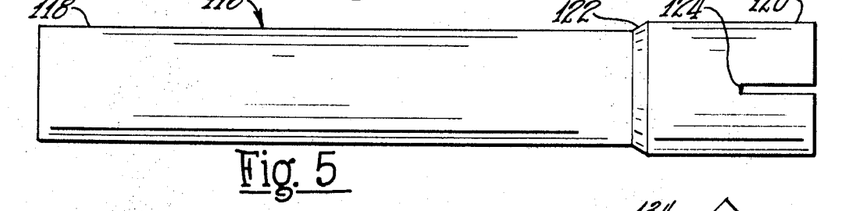
FIG. 5 is an elevational view of another form of adapter of the muffler construction.

FIG. 5 illustrates another form of coupling member 116 having a portion 118 adapted to telescope into a gas inlet passage tube or with a gas outlet passage tube of a muffler construction of the character shown in FIG. 1.

In this form the coupling member 116 is fashioned with an end region 120 of enlarged interior diameter so as to be operatively connected with an exhaust pipe or a tail pipe of a size to fit interiorly of the enlarged portion 120. The portion 120 may be formed by an expanding die of conventional construction placed within the tubular member and expanded to provide the portion 120.

The portion 120 is integrally joined with the tubular portion 118 by the tapered or frustoconically shaped portion 122. The portion 120 may be provided with diametrically-opposed open-ended slots 124 whereby the portion 120 may be readily drawn up by a clamping means such as clamping means 84 into gastight engagement with an exhaust pipe or with a tail pipe. It is to be understood that the coupling members have their major lengths of a diameter to be slidably telescopingly received into the gas passage tubes in the manner illustrated in FIG. 1, and that the end portions illustrated at 108 in FIG. 4 and 120 in FIG. 5 may be of different diameters, one to fit an exhaust pipe of one diameter and the other to fit a tail pipe of a different diameter.

The major length of each coupling member is fashioned of a diameter so that it may be telescoped into a gas passage means of the muffler irrespective of the size of the exhaust pipe or the size of the tail pipe with which it is to be connected as the end portions may be of reduced diameter or enlarged diameter to fit the exhaust pipe and tail pipe of a particular exhaust gas conveying system on an automotive vehicle. Through this method one muffler construction may be employed as a replacement for more than one type or size of muffler through the universal connection or mounting provided by the coupling members having end regions fashioned for connection with gas conveying pipes of different diameters.

Figure 6:
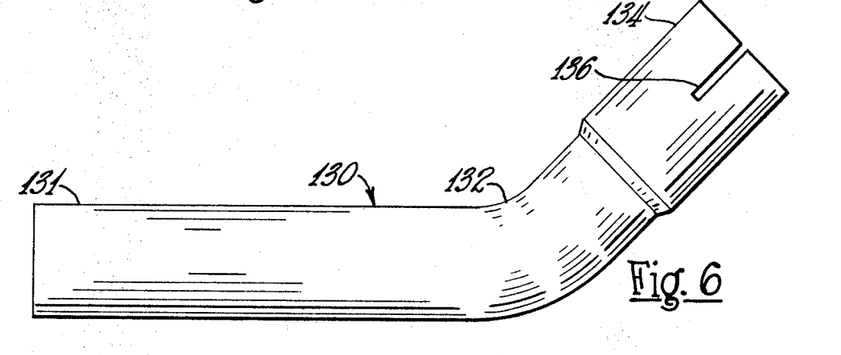
FIG. 6 is an elevational view of an angular adapter.

FIG. 6 illustrates a further configuration of coupling member for adapting a muffler for a replacement installation where the tail pipe may not be aligned with the exhaust pipe. In the form shown in FIG. 6, the coupling member 130 has a substantial rectilinear portion 131 of uniform diameter telescopingly disposed in the gas passage means either at the inlet or the outlet of the muffler construction such as shown in FIG. 1. The coupling member 130 may be fashioned with a bend 132 and an end portion 134 having an enlarged interior diameter to accommodate an exhaust pipe or a tail pipe of a diameter larger than the diameter of the portion 132.

If the exhaust pipe or tail pipe to be connected with the coupling member 130 is of reduced diameter, then the portion 134 may be of reduced diameter similar to the portion 108 in the form of coupling member shown in FIG. 4. Diametrically-opposed open-ended slots 136 may be provided in the portion 134 so that the said portion may be drawn into gastight engagement with an exhaust pipe or a tail pipe by means of a clamp 84 or other suitable clamping means.

It is to be understood that in installations where the muffler may be diagonally arranged with respect to the longitudinal axis of the vehicle, the coupling member, shown in FIG. 6, with the bend configuration may be telescoped in one gas passage means of the muffler and one of the straight or rectilinear coupling members such as shown in FIGS. 1, 4 or 5 telescoped into the gas passage means at the opposite end of the muffler.

Thus, through the use of coupling members of different dimensional characteristics and coupling members shaped or configured to accommodate diagonally arranged muffler installations, one muffler, such as the muffler shown in FIG. 1, may be used as a muffler replacement in different models or makes of automotive vehicles so as to substantially reduce the inventory of mufflers which a muffler distributor carries in stock in order to provide mufflers for installation on various models and makes of vehicles. It is also to be understood that the coupling members such as those shown in FIGS. 1, 4, 5 and 6 may be of varying lengths to accommodate particular positions of installation of a muffler in an exhaust gas conveying system of an automotive vehicle.

Figure 7:
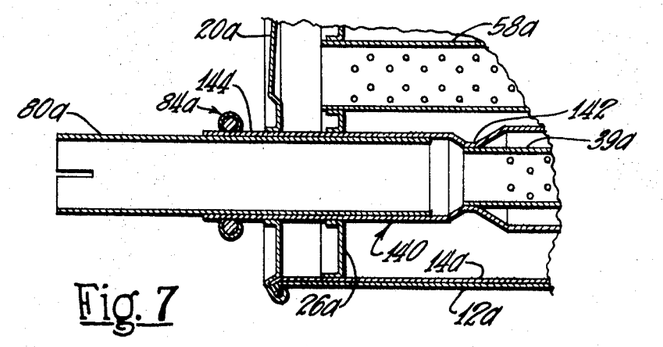
FIG. 7 is a fragmentary sectional view of a portion of form muffler and a form of adapter means embodied therein.

FIG. 7 is a fragmentary sectional view of a portion of a muffler similar to the muffler shown in FIG. 1 with a modified gas passage means slidably accommodating a tubular coupling member. The muffler includes the double wall shell or housing 12a, 14a and end heads, one of which is shown at 20a.

An inlet gas passage means or tube 140 has a crimped or pinched region 142 in snug engagement with a gas passage means or tube 39a. The muffler is also provided with a gas passage means 58a, the tube 140 and gas passage means 58a extending through an opening in a transverse baffle 26a.

The other components of the muffler (not shown in FIG. 7) are similar to the corresponding components illustrated in FIG. 1. Telescoped into the inlet gas passage means or tube 140 is a coupling member 80a which is slidably adjustable relative to the gas passage tube 140 in the same manner as hereinbefore described in reference to FIG. 1. In the form shown in FIG. 7, the portion of the gas passage tube 140, which is contiguous with the coupling member 80a, is of an interior diameter to snugly yet slidably accommodate the coupling member 80a.

The outlet gas passage means or tube may be of the same construction so as to snugly yet slidably accommodate a coupling member. The portion 144 of the inlet gas passage means extending exteriorly of the end wall or head 20a is of the same diameter as the portion of the gas passage means adjacent and interiorly of the end head 20a. In installing the muffler in an exhaust gas conveying system, the coupling member 80a is slidably moved outwardly relative to the gas passage tube 140 into telescoping coupling engagement with an exhaust pipe.

The clamp means 84a is then drawn up to secure the exterior portion 144 of the gas passage tube 140 in tight engagement with the nipple member 80a thereby providing a gastight construction, the coupling member or adapter 80a providing support for the muffler. The outlet gas passage tube may be fashioned similarly to the inlet gas passage tube to slidably accommodate an outlet coupling member.

Figure 8:
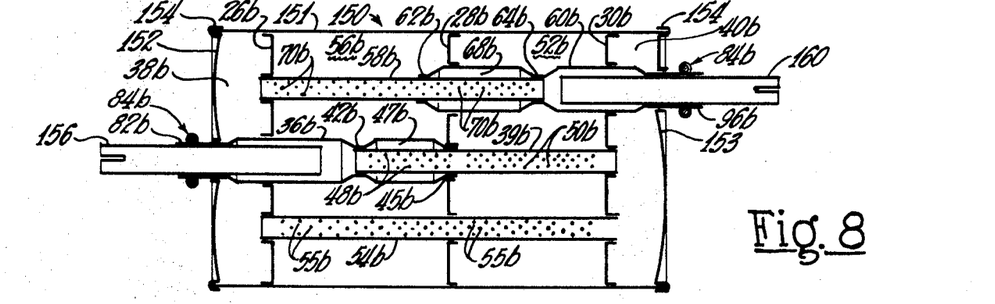
FIG. 8 is a schematic longitudinal sectional view illustrating another form of muffler construction of oval cross section embodying adapter means.

FIG. 8 illustrates a modified form of sound attenuating device or muffler embodying the invention particularly for use as a replacement muffler in an exhaust gas conveying system of an internal combustion engine of an automotive vehicle. This form of muffler construction 150 comprises a shell, casing or housing 151 preferably having a dual layer wall of the character illustrated in FIG. 1. The shell or housing 151 is inclusive of an end head or end wall 152 at the inlet end of the muffler and an end head or end wall 153 of the outlet end of the muffler, the end heads being joined to the shell 151 by lock seam joints 154 of the character shown in FIG. 1.

The muffler 150 is preferably of oval shape in cross section similar to the shape illustrated in FIG. 2. In the arrangement illustrated in FIG. 8, the gas inlet passage means or tube 36b extends through an opening in the central region of the end head or end wall 152 and is in overlapping relation with the gas passage means or tube 39b which is telescoped into a portion of the tube 36b. The gas passage means or tubes 36b and 39b extend through openings in lengthwise spaced baffles or partitions 26b, 28b and 30b.

The tube 36b is crimped or pinched into engagement with the exterior surface of the tube 39b at spaced regions 42b and 45b providing an annular high frequency sound attenuating chamber 47b. The wall portion of the tube 39b adjacent chamber 37b is provided with a large number of openings 48b forming acoustic couplings with the chamber 47b. The portion of the tube 39b adjacent a chamber 52b between the baffles 28b and 30b is provided with outlets 50b for transverse passage of gases through the chamber 52b and forming acoustic couplings with the chamber 52b.

The tube 39b into the chamber 40b. Disposed at one side of the gas passage means 36b, 39 is a second gas passage means or tube 54b extending through openings in the baffles 26b, 28b and 30b and opening into the end chambers 38b and 40b. The tube 54b has a large number of small openings 55b providing acoustic couplings with the chamber 52b and with the chamber 56b, the latter being defined by the partitions or baffles 26b and 28b.

The muffler is fashioned with gas outlet passage means provided by the tubes 58b and 60b. The tube 60b is in partial telescoped relation with a portion of the tube 58b, the regions 62b and 64b being crimped or pinched into snug engagement with the gas passage tube 58b forming an annular high frequency sound attentuating chamber 68b. The gas passage tubes 58b and 60b are disposed parallel to and at a side of the inlet gas passage means 36b and 39b opposite the tube 54b and provide an exhaust outlet means. The tube 60b extends through openings in the baffles 28b and 30b and the tube 58b extends through an opening in the baffle 26b, the tube 58b opening into the end chamber 38b.

The arrangement shown in FIG. 8 embodies coupling members or adapters telescoped into the inlet and outlet gas passage tubes 36b and 60b. The inlet gas passage tube 36b is fashioned with a portion 82b projecting exteriorly of the end head or end wall 152. Snugly, yet slidably, fitted or telescoped interiorly of the portion 82b is a tubular inlet coupling member or adapter 156. The tubular coupling member 156 is slidably adjustable lengthwise of the muffler so that the coupling member may be telescopingly engaged in overlapping relation with the exhaust pipe (not shown) of the exhaust gas conveying system for clamping connection with the exhaust pipe.

The portion 82b is secured in adjusted position in snug, gastight relation with the coupling member or adapter 156 by drawing up the clamp means 84b, which may be of the type shown in FIG. 3, embracing the portion 82b. The outer end of the coupling member 156 is clamped to the end region of an exhaust pipe by similar clamp means in the manner hereinbefore described in connection with the arrangement shown in FIG. 1.

A tubular coupling member or adapter 160 is telescoped into the outlet gas passage means or tube 60b. The portion 96b of the gas passage tube 60b is of a diameter to snugly, yet slidably, accommodate the tubular coupling member 160.

In installing the muffler, the tubular coupling member 160 is slidably moved relative to the gas passage tube 60b into overlapping telescoping relation with the end region of a tail pipe of the character shown at 76 in FIG. 1.

A clamp means 84b is drawn up to securely fasten or anchor the tubular coupling member 160 to the portion 96b of the gas passage tube 60b, and a similar coupling means embraces the outer end region of the coupling member 160 to securely fasten or anchor the coupling member to the tail pipe telescoped with the end region of the coupling member 160. In this form of construction, the exhaust gas inlet passage means 36b is arranged at the central region of the muffler construction and the exhaust outlet passage means 60b is arranged at one side of and in parallelism with the inlet gas passage means.

When the muffler 150 is installed in an exhaust gas conveying system of an internal combustion engine, exhaust gas from the exhaust pipe flows through the coupling member 156, inlet gas passage means 36b and 39b into chamber 40b thence in a reverse direction through the gas passage tube 54b into chamber 38b thence transversely through the chamber, the gas flowing from the chamber in a right-hand direction through the gas passage tubes 58b and 60b thence through the coupling member 160 and into a tail pipe connected with the coupling member.

Some of the gases in tube 39b flow transversely through openings 50b chamber 52b and through openings 55b into the gas passage tube 54b. Some gases in the tube 54b flow through the openings 55b in registration with the chamber 56b and move transversely through the chamber and through openings 70b into the gas passage tube 58b.

Figure 9:
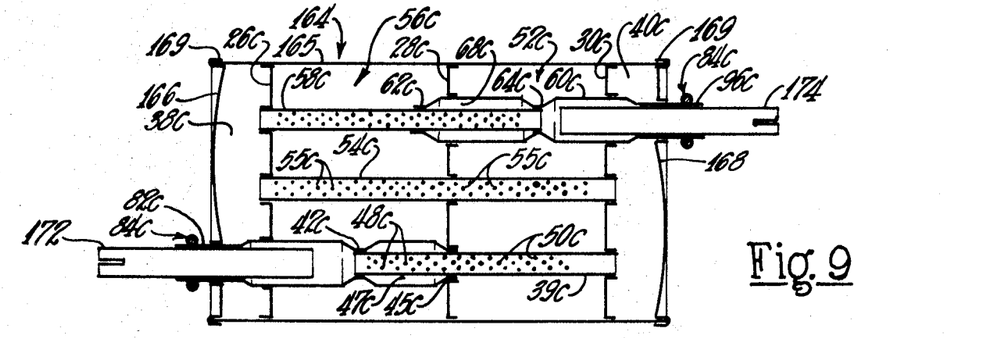
FIG. 9 is a schematic longitudinal sectional view illustrating still another form of muffler construction of oval cross section embodying adapter means.

FIG. 9 illustrates another modification of muffler construction embodying the invention. The muffler construction 164 shown in FIG. 9 is inclusive of a sheet metal housing or shell 165 which may be of a single or double layer of sheet metal. End heads or end walls 166 and 168 are provided at each end of the shell 165 and are secured to the shell or housing by a lock seam construction 169 of the character shown at 24 in FIG. 1. The muffler 164 is preferably oval shape in cross section similar to the shape illustrated in FIG. 2.

In the form shown in FIG. 9, the gas inlet passage means or tube 36c extends through an opening in the end wall or end head 166 at one side of the central region of the end head. The tube 36c is in overlapping telescoping relation with a portion of e gas passage means or tube 39c. The tube 36c extends through openings in baffles 26c and 28c, and the gas passage tube 39c extends into an opening in baffle 30c and opens into a chamber 40c defined between the baffle 30c and end wall 168. The tube 36c is pinched or crimped into engagement with the exterior surface of the tube 39c at the regions 42c and 45c providing an annular high frequency sound attentuating chamber 47c.

The wall of the tube 39c is fashioned with small outlets or openings 48c forming acoustic couplings with the chamber 47c, the openings 50c in the tube 39c providing acoustic couplings with the chamber 52c defined between the baffles 28c and 30c, the outlets 50c facilitating transverse flow of gases in the chamber 52c.

Disposed centrally of the muffler is a gas passage means or tube 54c extending through openings in the baffles 26c, 28c and 30c, one end opening into the chamber 38c defined between the end wall 166 and the baffle 26c, the other end opening into the chamber 40c.

The tube 54c has a large number of openings or outlets 55c which provide acoustic couplings with chamber 52c and chamber 56c, the latter being defined by the baffles 26c and 28c. The muffler is fashioned with gas outlet passage means provided by gas passage tubes 58c and 60c. The tubes 58c and 60c are axially aligned and disposed at the side of the gas passage tube 54c opposite the gas passage tubes 36c and 39c. A portion of the tube 60c is partially telescoped with a portion of the tube 58c and the regions 62c and 64c are crimped or pinched into snug engagement with the tube 58c providing an annular sound attentuating chamber 68c.

The tube 60c provides outlet gas passage means, the tube 60c extending through openings in the baffles 28c and 30c. An end of gas passage tube 58c opens into the chamber 38c. The arrangement shown in FIG. 9 embodies coupling members telescoped into the inlet and outlet gas passage tubes 36c and 60c. The tube 36c is fashioned with a portion 82c projecting exteriorly of the end wall 166. Snugly yet slidably fitted interiorly of the portion 82c is an inlet coupling member or adapter 172.

The coupling member 172 is telescopingly disposed in a portion of the gas passage tube 36c and is slidable lengthwise of the muffler so that the coupling member may be telescopingly engaged in overlapping relation with the end region of an exhaust pipe of the character shown at 74 in FIG. 1 establishing connection with the exhaust pipe. The portion 82c is secured in adjusted position in gastight relation with the coupling member 172 by drawing up the clamp means 84c which embraces the portion 82c exteriorly of the end wall 166.

The outer end of the coupling member or adapter 172, telescoped with the exhaust pipe, is clamped to the exhaust pipe by clamp means in the manner described in connection with the arrangement shown in FIG. 1. A tubular coupling member or adapter 174 is telescoped into the outlet gas passage means provided by the tube 60c. The portion 96c of the tube 60c is of a diameter to snugly, yet slidably accommodate the tubular coupling member 174 telescoped therewith.

In installing the muffler, the coupling member 174 is slidably moved outwardly of the end wall 168 into telescopingly overlapping engagement with a tail pipe of the character shown at 76 in FIG. 1. The clamp means 84c is adjacent the portion 96c of the tube 60c is drawn up to securely fasten the portion 96c in clamping gastight engagement with the tubular coupling member or adapter 174. A clamp means embraces the region of the tube 174 in overlapping relation with the tail pipe and is drawn up to secure the coupling member 174 in gastight engagement with the tail pipe.

The path of the exhaust gases through the muffler shown in FIG. 9 is as follows: Exhaust gases from the exhaust pipe enter the coupling member 172 and flow through gas passage tubes 36c and 39c into the chamber 40c thence tranversely through chamber 40c and into tube 54c wherein the gas flows in a reverse direction into chamber 38c thence tranversely in chamber 38c into tube 58c and through tube 60c and coupling member 174 into the tail pipe. Some of the gases in the tube 39c flow through openings 50c through chamber 52c and through openings 55c into the gas passage tube 54c.

Some of the gases in tube 54c flow through openings 55c in registration with chamber 56c into the chamber 56c and through openings in the wall of the gas passage tube 58c for conveyance into the tail pipe. The muffler thus installed in an exhaust gas conveying system is solely supported through the coupling members 172 and 174 by the exhaust pipe and tail pipe constructions.

Figure 10:
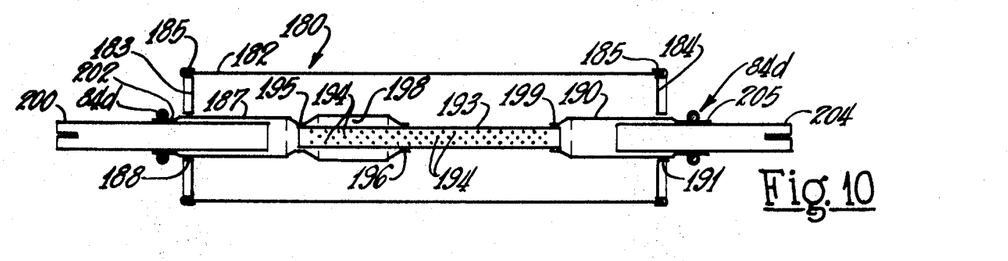
FIG. 10 is a schematic longitudinal sectional view of the "straight through" type muffler embodying adapter means.

FIG. 10 illustrates a muffler construction of the "straight through" type embodying the invention. In this form the muffler construction 180 is inclusive of a tubular housing or shell 182 preferably of circular cross section which may be a single layer or dual layer construction as described in connection with FIG. 1. The shell 182 is fashioned with end walls or end heads 183 and 184 secured to the shell by lock seams 185 of the character shown at 24 in FIG. 1.

The end head or end wall 183 at the gas inlet end of the muffler has an opening in which is disposed an inlet gas passage means or tube 187, the end wall 183 being welded at the region 188 to the exterior surface of the tube 187 throughout the periphery of the tube to form a gastight joint. The end wall or head 184 is fashioned with an opening through which extends an outlet gas passage means or tube 190, the end wall 184 being welded at the region 191 to the tube 190 throughout its periphery to form a gastight joint.

Axially disposed between the gas passage tubes 187 and 190 is a gas passage means or tube 193 the wall of which is provided with small openings or outlets 194 throughout substantially its length. An intermediate region of the gas passage tube 187 is pinched or crimped inwardly as at 195 in the manner illustrated in FIG. 2 whereby the contracted region of the tube at region 195 snugly engages the periphery of the inlet end of the gas passage tube 193.

The inner end region of the inlet gas passage tube 187 is likewise pinched or crimped at 196 into snug engagement with an intermediate region of the tube 193. The annular space 198 surrounding the gas passage tube 193 between the regions 195 and 196 provides a high frequency sound attentuating chamber, the openings 194 in the wall of the gas passage tube adjacent the chamber 198 forming acoustic couplings with the chamber. The other openings 194 form acoustic couplings with the chamber or confined zone defined by the shell 182 and the end walls.

The inner end of the gas passage tube 190 is pinched or crimped as at 199 into contiguous engagement with the peripheral end region of the gas passage tube 193. Telescopingly disposed in the region of the inlet gas passage tube 187 adjacent the end wall 183 is a tubular coupling member or adapter 200. The tube 187 is fashioned with a portion 202 exteriorly of the end wall 183 of slightly reduced diameter which is in snug but slidable engagement with the tubular coupling member 200.

In installing the muffler 180 as a replacement in an exhaust gas conveying system of an internal combustion engine of a vehicle, the coupling member or adapter 200 is slidably moved outwardly of the muffler engaging the end region of the coupling member in overlapping telescoping relation with the severed end region of the existing exhaust pipe which had been previously severed to remove the worn muffler. A clamp means 84d embraces the portion 202 of the inlet gas passage tube 187 and is drawn up to securely hold or fasten the portion 202 to the coupling member 200.

A similar clamp means is applied to the overlapping region of the coupling member 200 with the exhaust pipe and is drawn up to form a gastight connection. Telescoped into a region of the gas outlet tube 190 adjacent the end wall 184 is a tubular opening member or adapter 204. The gas passage tube 190 is fashioned with a portion 205 of slightly reduced diameter which is in contiguous slidable engagement with the coupling member 204.

The slidable coupling member 204 is moved outwardly into telescoping overlapping engagement with the end of the tail pipe which has been previously severed to remove the worn muffler. A clamp means 84d embraces the portion 205 of the outlet tube, the clamp means being drawn up to securely hold the coupling member 204 in adjusted position relative to the muffler shell and provide a gastight seal between the tubular portion 205 and the coupling member 204. A similar clamp means is applied to the region of the outlet coupling member 204 in overlapping telescoped engagement with the tail pipe to securely hold the coupling member 204 to the tail pipe.

Through this method, the replacement muffler may be quickly installed and is supported solely by the existing exhaust and tail pipes through the medium of the coupling members or adapters 200 and 204. In this form of construction the exhaust gases from the exhaust pipe flow in a rectilinear path through the coupling member 200 and the gas passage tubes 187, 193 and 190 in sequence, thence through the outlet coupling member 204 into the tail pipe.

Figure 11:
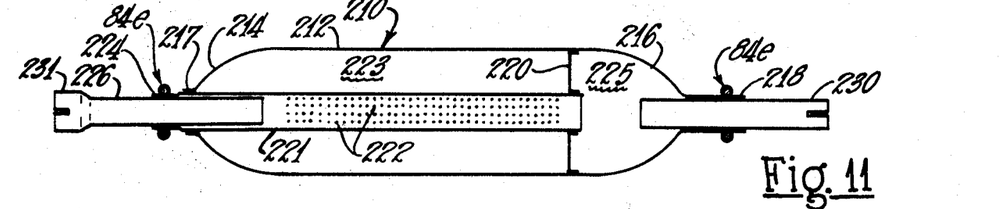
FIG. 11 is a schematic longitudinal sectional view illustrating a "straight through" muffler with a one-piece shell and embodying adapter means.

FIG. 11 illustrates another form of muffler construction embodying the invention. In this form the muffler 210 is of circular cross section, the shell or housing 212 being fashioned of a length of metal tubing. The end regions 214 and 216 of the tubular shell are curved or converged inwardly whereby the portions 214 and 216 form end walls of the muffler. The curvature of the end wall 214 at the inlet end of the muffler terminates in a tubular projecting portion 217 defining a central opening in the end wall 214.

The curvature of the end wall 216 at the outlet end of the muffler terminates in a tubular projecting portion 218 which may be of greater length than the tubular portion 217. Disposed within the muffler shell 212 is a transverse partition or baffle 220. Disposed within the muffler and extending axially of the shell or housing 212 is a gas passage means or tube 221. One end of the tube 221 extends into an opening in the baffle member 220, and is supported by the baffle member.

The wall of the tube 221 is fashioned with a large number of small outlets or openings 222 which form acoustic couplings with the space or chamber 223 surrounding the tube 221 for attentuating sound waves entrained in the exhaust gas stream. The chamber 225, defined between the end wall 216 and baffle 220, provides a resonator for attenuating sound waves of comparatively low frequencies. The tubular portion 217 of the end wall 214 snugly receives the tube 221 and is welded to the tube throughout its periphery to form a gastight joint.

A portion 224 of the gas passage tube 221 exteriorly of the end wall 214 is preferably of slightly reduced diameter as shown. Telescopingly and slidably disposed in the gas inlet end region of the tube 221 is a tubular coupling member or adapter 226. The adapter 226 may have an enlarged end region 231 to fit a particular size of exhaust pipe, the member or adapter 226 being of the character illustrated in FIG. 5. The adapter 226 is arranged to be slidably moved into overlapping engagement with the end of an exhaust pipe.

The gas outlet end of the muffler is provided with a tubular coupling member or adapter 230 telescoped within the tubular portion 218 of the muffler end wall 216. The coupling member 230 is of a diameter to be snugly received in the portion 218 and is slidably movable for telescoping overlapping connection with a tail pipe.

In installing the muffler 210 as a replacement, the worn muffler having been removed by severing the exhaust pipe and tail pipe at regions close to the worn muffler, the replacement muffler is disposed in position, the tubular coupling member 226 slidably adjusted outward of the muffler so that its end region 231 is telescoped in overlapping relation with the end of the exhaust pipe. The coupling member 230 is likewise slidably adjusted so that its end region is in telescoped overlapping relation with the tail pipe. A clamp means 84e embracing the portion 224 of the gas passage means 221 is drawn up to securely hold the coupling member 226 in its adjusted position and to form a gastight seal with the coupling member.

The clamping means 84e embracing the tubular portion 218 is drawn up to hold the tubular coupling member 230 in adjusted position and provide a gastight seal. Similar clamp means (not shown) embrace the end regions of the coupling members 226 and 230 and are drawn up to securely fasten or anchor the couplings 226 and 230 to the exhaust and tail pipes respectively. Through this arrangement the muffler is solely supported by the exhaust and tail pipes through the medium of the tubular couplings or adapters 226 and 230.

The foregoing described method of replacing a worn muffler with a muffler construction embodying adapter means for connection with the exhaust pipe and tail pipe of an exhaust gas conveying system from an engine of an automotive vehicle greatly reduces the time in installing a replacement muffler. The adapters provide a means for accommodating the muffler to the existing pipe and tail pipe enabling the continued operative use of the exhaust pipe and tail pipe.

Through the provision of telescoping adjustable adapter means, one type of muffler construction may be rendered usable as a replacement for different types and sizes of mufflers installed as original equipment on various models of automotive vehicles. Thus, the inventory of mufflers to accommodate the replacement of many different sizes and configurations of mufflers may be substantially reduced, hence reducing the cost of replacement of worn mufflers.

The adapters or coupling members may be of various lengths, of different shapes and sizes and may be fashioned with end regions of different diameters to fit various sizes of exhaust pipes and tail pipes, a factor rendering a muffler embodying the adapter means usable for replacements where it would otherwise be necessary to also replace the exhaust and tail pipes of the exhaust gas system.

It is apparent that, within the scope of the invention, modifications and different arrangements may be made other than as herein disclosed, and the present disclosure is illustrative merely, the invention comprehending all variations thereof.

I claim:

1. The method of installing a muffler with gas conveying pipes of an exhaust gas system of an internal combustion engine of an automotive vehicle including disposing the muffler between spaced first and second gas conveying pipes of the system, extending a first tube from the interior of the muffler into overlapping relation with the first gas conveying pipe, extending a second tube from the interior of the muffler into overlapping relation with the second gas conveying pipe, clamping each tube to the adjacent gas conveying pipe, and clamping the muffler to each of the tubes.

2. The method of connecting an elongated muffler with gas conveying pipes of an exhaust gas system of an internal combustion engine of an automotive vehicle including disposing the muffler between spaced ends of first and second gas conveying pipes of the system, slidably moving a first adapter outwardly from one end of the muffler into telescoping relation with the first gas conveying pipe, slidably moving a second adapter from the other end of the muffler into telescoping relation with the second gas conveying pipe, clamping each adapter to the adjacent gas conveying pipe, and clamping the muffler to each adapter.

3. The method of installing a replacement muffler with gas conveying pipes of an exhaust gas system of an internal combustion engine of an automotive vehicle including telescoping a tubular adapter into each end region of the muffler, disposing the muffler between spaced ends of first and second gas conveying pipes of the system, slidably moving one adapter partially outwardly of the muffler into overlapping telescoping connection with one of the gas conveying pipes, slidably moving the other adapter partially outwardly of the muffler into overlapping telescoping connection with the other gas conveying pipe, clamping each adapter to the adjacent gas conveying pipe, and clamping each adapter in its slidably adjusted position relative to the muffler.

4. A muffler for use with a moving gas stream including, in combination, an elongated muffler housing, said housing including portions providing end walls, gas passage means disposed in said housing, one of said end walls having an opening, a one-piece tubular coupling member extending through the opening in telescoping relation with said gas passage means, said tubular coupling being slidably adjustable relative to the gas passage means, and clamp means for securely fastening the tubular coupling member in slidably adjusted position relative to the muffler housing, the other end wall portion having an opening accommodating flow of gas through the muffler housing.

5. A muffler for use with a moving gas stream including, in combination, an elongated muffler housing, said housing including portions providing end walls, gas passage means disposed in said housing, one of said end walls having an opening, a one-piece tubular coupling member extending through the opening in telescoping relation with said gas passage means, said tubular coupling being slidably adjustable relative to the gas passage means, the other end wall having an opening, and tubular means associated with the opening in said other end wall accommodating flow of gas through the muffler housing.

6. A muffler for use with a moving gas stream including, in combination, an elongated muffler housing, said housing including portions providing end walls, each of said end walls having an opening, gas passage means associated with each opening accommodating flow of gas through the muffler, and tubular coupling members extending through the openings in telescoping relation with the respective gas passage means, each of said tubular coupling members being a one-piece construction and being slidably movable in the adjacent gas passage means and lengthwise of the housing to adjusted positions relative to the housing.

7. The combination according to claim 6 including clamp means for securing the tubular members in adjusted positions.

8. A muffler for use with a moving gas stream including, in combination, an elongated muffler housing, said housing including portions providing end walls, gas passage means disposed in said housing, one of said end walls having an opening, a one-piece tubular coupling member extending through the opening in telescoping relation with said gas passage means, said tubular coupling means slidably movable in said gas passage means and lengthwise of the housing, clamp means for securely fastening the tubular member in slidably adjusted position relative to the housing, the other end wall portion having an opening accommodating a gas conveying tube, and clamp means for securing the gas conveying tube to the end region of the muffler housing.

9. A muffler for use with a moving gas stream including, in combination, an elongated muffler housing, said housing including portions providing end walls, each of said end walls having an opening, gas passage means disposed in said housing, said gas passage means including gas passage tubes associated with each end wall portion of the housing and registering with the opening therein, a one-piece tubular coupling member telescoped into each of the gas passage tubes adjacent the end wall portions, each of said tubular couplings being slidably adjustable relative to the adjacent gas passage tube.

10. A muffler for use with a moving gas stream including, in combination, an elongated housing, said housing having end wall portions, one of said end wall portions having an opening, a gas passage tube disposed in said opening having a portion extending exteriorly of the end wall portion, transversely extending baffle means disposed in said housing, said baffle means having an opening accommodating said gas passage tube, a region of the wall of the gas passage tube within the housing having a plurality of outlets forming acoustic couplings with a space surrounding the gas passage tube, a one-piece tubular adapter telescoped within a portion of the gas passage tube for slidable adjustment relative to said tube, a gas outlet tube disposed in an opening in the other end wall portion of the housing, and a second one-piece tubular adapter telescoped within the gas outlet tube for slidable adjustment relative thereto.

11. The combination according to claim 10 including clamp means for securing said tubular adapters in adjusted positions.

12. A muffler for use with a moving gas stream including, in combination, an elongated housing, said housing including portions providing end walls, gas passage tubes disposed in laterally spaced relation in said housing, flange means on each end wall defining an opening therein, each gas passage tube extending into one of said openings, and a one-piece tubular adapter telescoped into each of the gas passage tubes, said adapters being slidably adjustable within and relative to the gas passage tubes.

13. The combination according to claim 12 wherein each gas passage tube is welded to housing, adjacent flange means, and clamp means for securing each gas passage tube to the adjacent adapter.

14. A muffler for use with a moving gas stream including, in combination, an elongated housing, said housing having end walls, flange means on each end wall defining respectively a gas inlet and a gas outlet, a plurality of transverse baffles in spaced relation in said housing, said baffles defining chambers in said housing, a first gas passage tube extending through said baffles in alignment with the inlet and being in communication with a chamber adjacent one end wall, a second gas passage tube in alignment with the outlet extending through openings in said baffles and in communication with a chamber adjacent the opposite end wall of the housing, one-piece tubular adapters telescoped into portions of said first and second gas passage tubes, said adapters being slidably adjustable relative to said tubes, and clamp means for securing the tubular adapters in adjusted positions to the flange means on the end walls.

15. The combination according to claim 14 including a third gas passage tube extending through openings in said baffles conveying gases from one end chamber to the other end chamber.

16. A muffler for use with a moving gas stream including, in combination, an elongated housing, said housing having end walls, each end wall having an opening providing respectively a gas inlet and a gas outlet; a plurality of transverse baffles in lengthwise spaced relation in said housing, said baffles defining chambers in said housing, a first gas passage tube extending through openings in said baffles and through the inlet and being in communication with a chamber adjacent one end wall, a second gas passage tube extending through the outlet and through openings in said baffles and being in communication with a chamber adjacent the opposite end wall of the housing, tubular adapters telescoped into portions of said first and second gas passage tubes respectively, said adapters being slidable for telescoping overlapping relation with exhaust conveying pipes exteriorly of the muffler, clamp means for securing the tubular adapters in fixed relation with the muffler housing, and clamp means for securing the tubular adapters in overlapping relation with the gas conveying pipes.

17. A muffler for use with a moving gas stream including, in combination, an elongated housing, said housing including portions providing end walls, flange means on each end wall defining respectively an inlet and an outlet, a plurality of transverse baffles in spaced relation in said housing, said baffles defining chambers in said housing, a first gas passage tube extending through openings in said baffles and into the inlet and being in communication with a chamber adjacent one end wall, a second gas passage tube extending into the outlet and through openings in said baffles and in communication with a chamber adjacent the opposite end wall of the housing, said gas passage tubes being welded to the flange means, an intermediate gas passage tube extending through openings in said baffles conveying gases from one end chamber to the other end chamber, tubular coupling members telescoped into portions of said first and second gas passage tubes respectively, said tubes being slidable for telescoping overlapping relation with exhaust conveying pipes exteriorly of the muffler, clamp means for securing the tubular coupling members in fixed relation with the muffler housing, and clamp means for securing the coupling members in overlapping relation with the gas conveying pipes.